(12) United States Patent
Shimada

(10) Patent No.: US 7,224,094 B2
(45) Date of Patent: May 29, 2007

(54) MAGNETIC BEARING SPINDLE

(75) Inventor: Akihiro Shimada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 303 days.

(21) Appl. No.: 10/486,984

(22) PCT Filed: Jul. 12, 2002

(86) PCT No.: PCT/JP02/07109

§ 371 (c)(1),
(2), (4) Date: Oct. 12, 2004

(87) PCT Pub. No.: WO2004/007982

PCT Pub. Date: Jan. 22, 2004

(65) Prior Publication Data
US 2006/0175920 A1    Aug. 10, 2006

(51) Int. Cl.
*H02K 7/09* (2006.01)
*F16C 32/04* (2006.01)
*B23Q 11/12* (2006.01)

(52) U.S. Cl. ...................... 310/90.5; 310/58
(58) Field of Classification Search ............... 310/90.5, 310/58
See application file for complete search history.

(56) References Cited

U.S. PATENT DOCUMENTS

| | | | | |
|---|---|---|---|---|
| 2,953,993 | A | | 9/1960 | Strickland et al. .......... 417/356 |
| 4,523,896 | A | * | 6/1985 | Lhenry et al. ............... 417/244 |
| 4,935,654 | A | | 6/1990 | Glass et al. ................ 310/90.5 |
| 5,027,280 | A | * | 6/1991 | Ando et al. ................ 700/174 |
| 5,804,900 | A | | 9/1998 | Taniguchi et al. .......... 310/90.5 |
| 6,057,619 | A | | 5/2000 | Domberg et al. .......... 310/90.5 |
| 6,288,465 | B1 | * | 9/2001 | Suzuki et al. .............. 310/90.5 |
| 6,351,048 | B1 | | 2/2002 | Schob et al. ............... 310/90.5 |
| 6,373,156 | B2 | * | 4/2002 | Suzuki et al. ............. 310/68 B |
| 6,508,614 | B1 | * | 1/2003 | Ozaki et al. ................ 409/231 |
| 2006/0163962 | A1 | * | 7/2006 | Shimada .................... 310/90.5 |
| 2006/0175920 | A1 | * | 8/2006 | Shimada .................... 310/90.5 |

FOREIGN PATENT DOCUMENTS

EP    0 087 197 A    8/1983

(Continued)

OTHER PUBLICATIONS

Masahiro Ohtani et al. Ultrahigh Speed Processing by Magnetic Bearing Main Shaft and Application of the Same, Mitsubishi Denki Giho, Oct. 2001.

*Primary Examiner*—Karl Imayoshi Tamai
(74) *Attorney, Agent, or Firm*—Sughrue Mion, PLLC

(57) ABSTRACT

A magnetic bearing spindle includes a radial magnetic bearing rotor fabricated by laminating a ring-like plate made of electromagnetic steel sheet, an axial magnetic bearing rotor made of magnetic material, and a main shaft motor rotor. A rotation shaft is fit rotatably in these rotors and a plurality of electromagnets are disposed around the rotation shaft. A bracket is provided with a cooling air supply port, and an air passage is provided in a frame. An outer peripheral portion of the axial magnetic bearing rotor is provided with a triangular portion. An outer peripheral portion of an axial direction positioning collar of an axial magnetic bearing stator is provided with through holes. Cooling air is supplied from the through holes.

17 Claims, 9 Drawing Sheets

FOREIGN PATENT DOCUMENTS

| | | |
|---|---|---|
| JP | 02-057719 A | 2/1990 |
| JP | 2-53516 U | 4/1990 |
| JP | 04-161035 A | 6/1992 |
| JP | 4-92755 U | 8/1992 |
| JP | 4-118958 U | 10/1992 |
| JP | 04-322144 * | 11/1992 |
| JP | 5-71533 A | 3/1993 |
| JP | 6-45700 | 11/1994 |
| JP | 8-61366 A | 3/1996 |
| JP | 9-133133 A | 5/1997 |
| JP | 09-150345 A | 6/1997 |
| JP | 10-309064 A | 11/1998 |
| WO | 2005/003580 * | 1/2005 |

* cited by examiner

US 7,224,094 B2

MAGNETIC BEARING SPINDLE

TECHNICAL FIELD

The present invention relates to a magnetic bearing spindle used as a machine tool spindle.

BACKGROUND ART

Magnetic bearings realize super high speed rotation which is difficult to realize in ball bearings. Magnetic bearings used as machine tool spindles are also aimed at realizing super high speed rotation. Although the magnetic bearing realizes super high speed rotation, the magnetic bearing generates more heat than the ball bearing as the magnetic bearing has more electrical components than the ball bearing. Therefore, a cooing fluid is passed through a rotation shaft to cool the rotation shaft of a spindle unit. For example, Japanese Patent Application Laid-open No. H9-150345, discloses such a cooling apparatus.

This cooling apparatus suits well to a spindle unit that realizes a relatively low rotation speed, however, does not suit to a spindle unit that realizes a super high rotation range. Precisely, in the spindle unit that realizes a super high rotation range, mechanical parts that function as a path for the cooling fluid have limitations due to high speed performance, lifetime, and the like. Therefore, if this cooling apparatus used in the spindle unit that realizes a super high rotation range, these mechanical parts get damaged.

It is an object of the present invention to solve at least the problems in the conventional technology.

A magnetic bearing spindle according to one aspect of the present invention includes a rotation shaft that is held rotatably in a radial magnetic bearing rotor, an axial magnetic bearing rotor, a main shaft motor rotor, and an axial magnetic bearing stator, the axial magnetic bearing stator having an axial direction positioning member, an outer peripheral portion of the axial direction positioning member having a plurality of through holes, the outer peripheral portion of the axial magnetic bearing rotor is formed into a triangular shape or a shape corresponding to a triangular shape; a plurality of electromagnets disposed around the rotation shaft; and a casing that accommodates the rotation shaft and the electromagnets and includes an air passage to pass cooling air from outside to the through holes.

A magnetic bearing spindle according to another aspect of the present invention includes a rotation shaft that is held rotatably in a radial magnetic bearing rotor, an axial magnetic bearing rotor, a main shaft motor rotor, and an axial magnetic bearing stator, the axial magnetic bearing stator having an axial direction positioning member, an outer peripheral portion of the axial direction positioning member having a plurality of first through holes, portions of an outer magnetic pole tooth of the axial magnetic bearing stator, to which the axial magnetic bearing rotor is not opposed and which are not necessary for a magnetic circuit, are provided with a plurality of second through holes that are parallel to an axial direction of the rotation shaft and that communicate with the first through holes; a plurality of electromagnets disposed around the rotation shaft; and a casing that accommodates the rotation shaft and the electromagnets and includes an air passage to pass cooling air from outside to the first through holes.

A magnetic bearing spindle according to still another aspect of the present invention includes a rotation shaft that is held rotatably in a radial magnetic bearing rotor, an axial magnetic bearing rotor, a main shaft motor rotor, an axial magnetic bearing stator, and a main shaft motor stator, the axial magnetic bearing stator having an axial direction positioning member, an outer peripheral portion of the axial direction positioning member having a plurality of first through holes, a plurality of through holes that are parallel to an axial direction of the rotation shaft are provided in a portion of a core back of the radial magnetic bearing rotor and in a first portion of an outer magnetic pole tooth of the axial magnetic bearing stator and in a second portion of a core back of the main shaft motor stator that is disposed in the vicinity of the main shaft motor rotor, the first portion and the second portion being not necessary for a magnetic circuit; a plurality of electromagnets disposed around the rotation shaft; and a casing that accommodates the rotation shaft and the electromagnets and includes an air passage to pass cooling air from outside to the through holes.

The other objects, features and advantages of the present invention are specifically set forth in or will become apparent from the following detailed descriptions of the present invention when read in conjunction with the accompanying drawings.

Figure 2:
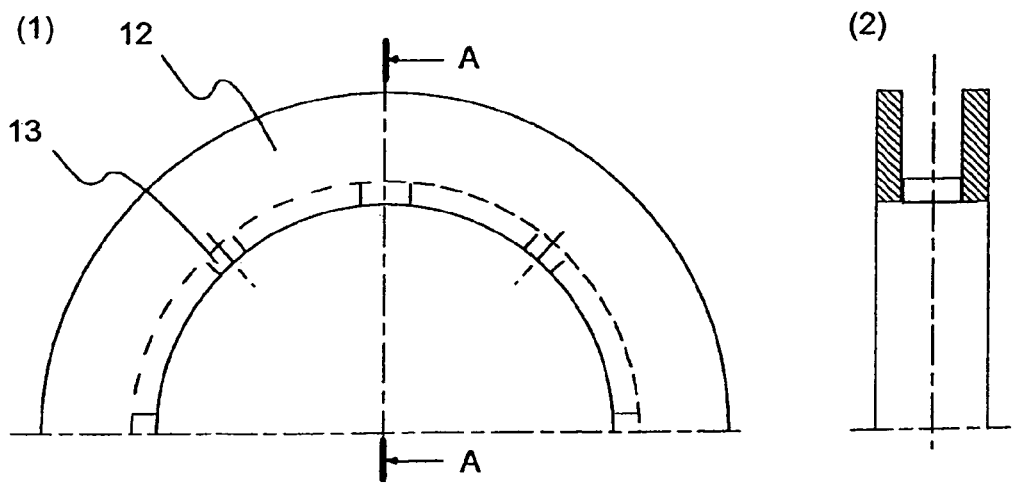
Figure 3:
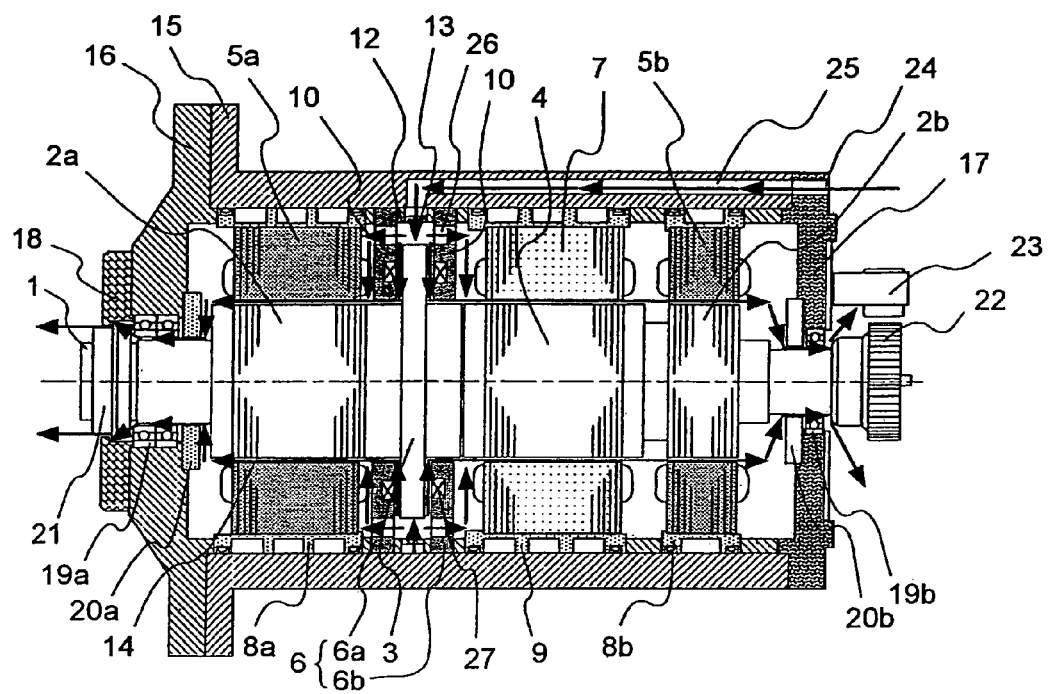
Figure 4:
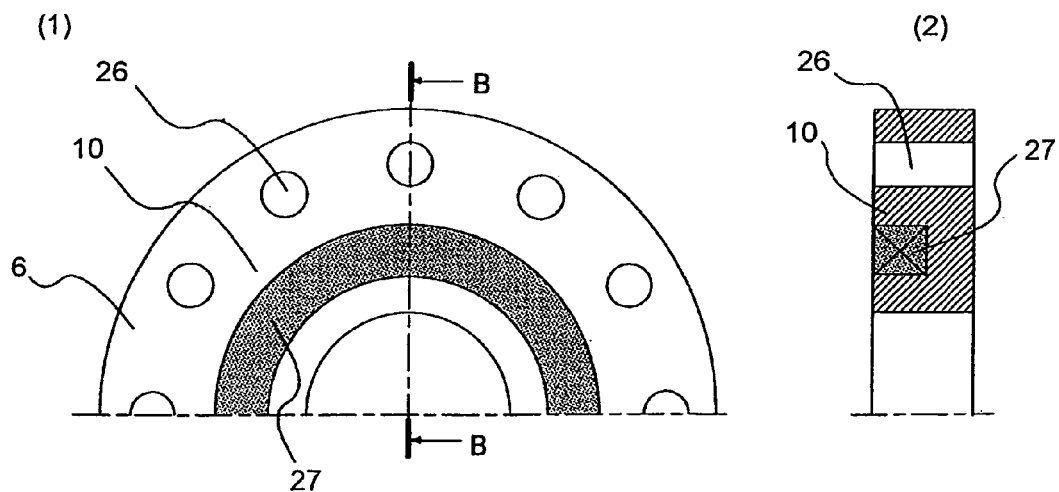
Figure 5:
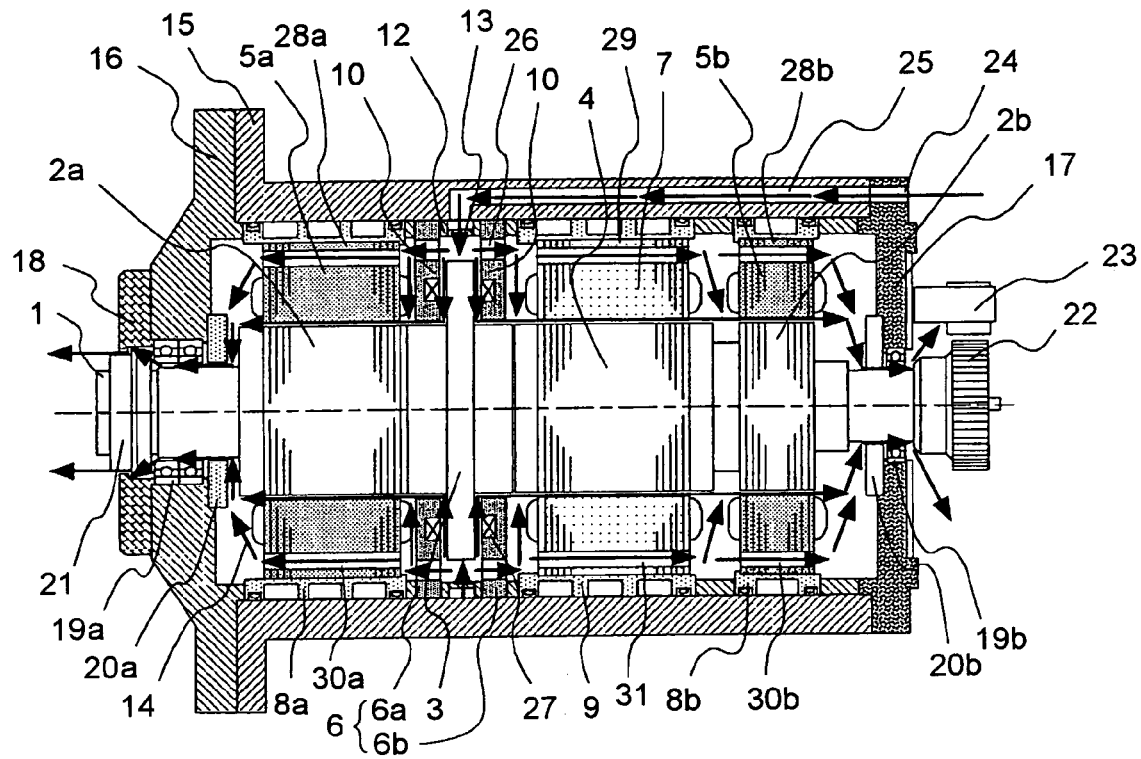
Figure 6:
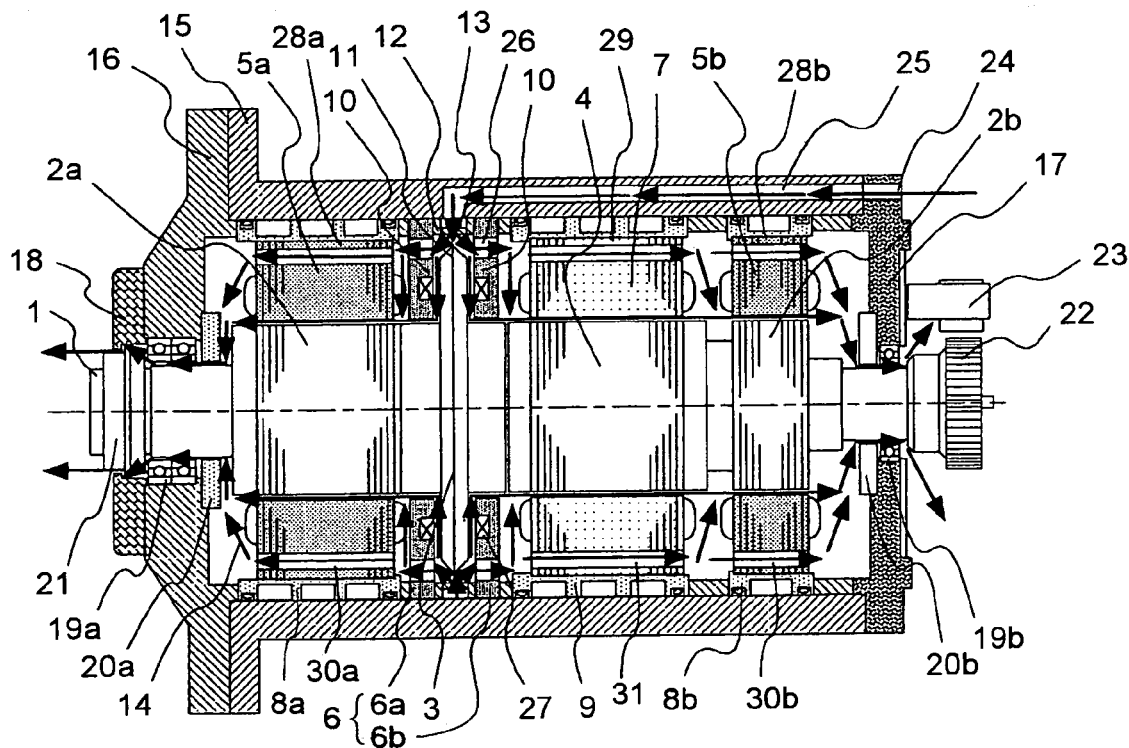
Figure 7:
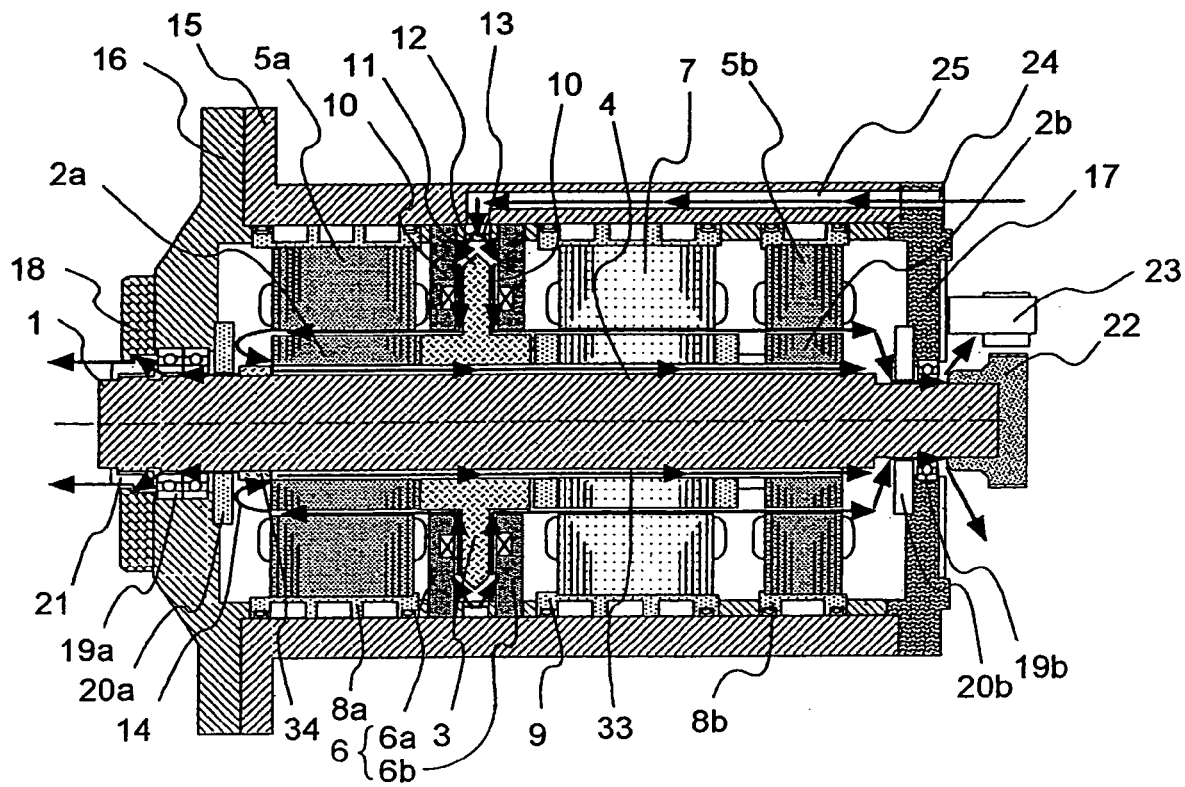
Figure 8:
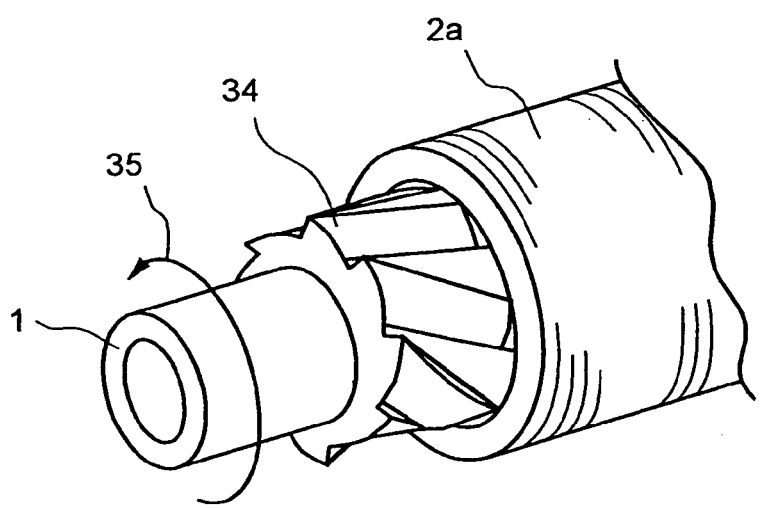
Figure 9:
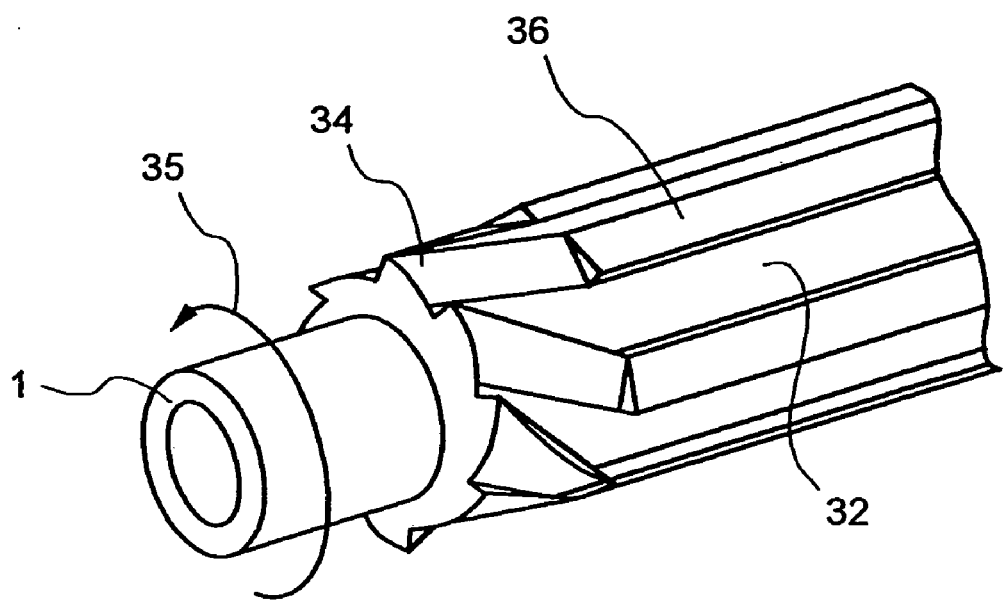
Figure 10:
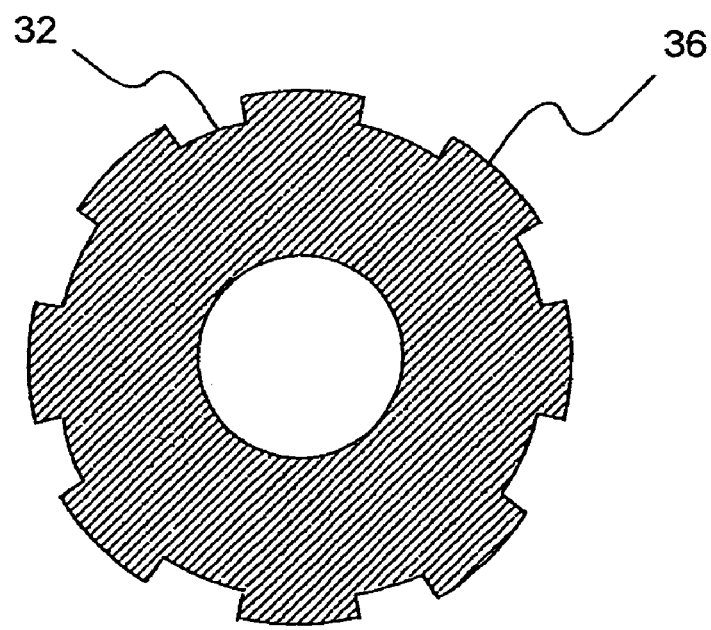
Figure 11:
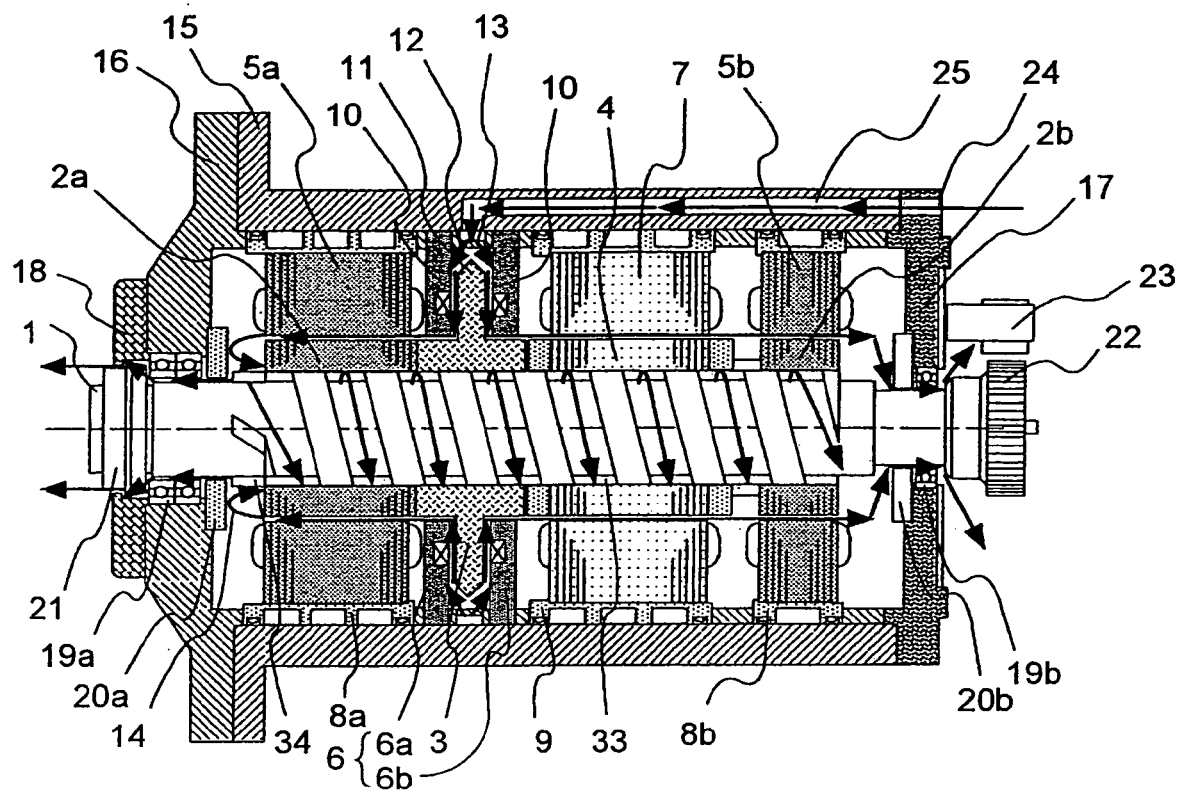
Figure 12:
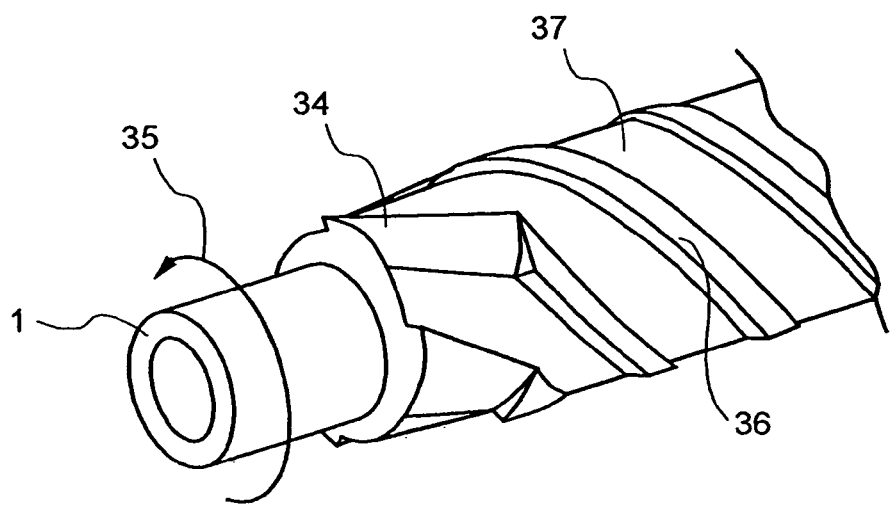
Figure 13:
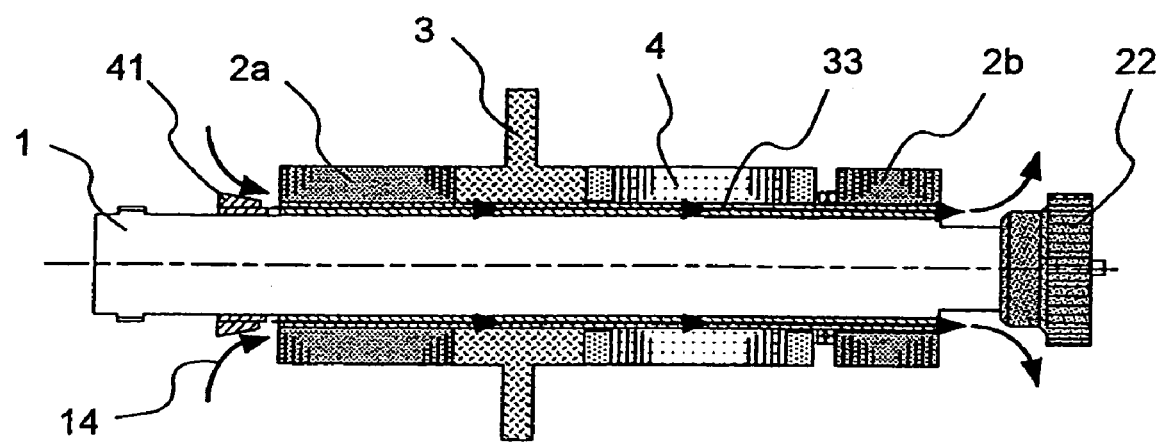
Figure 14:
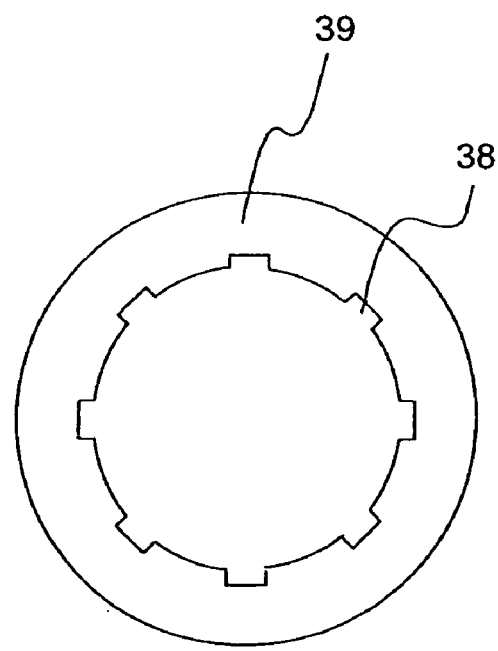
Figure 15:
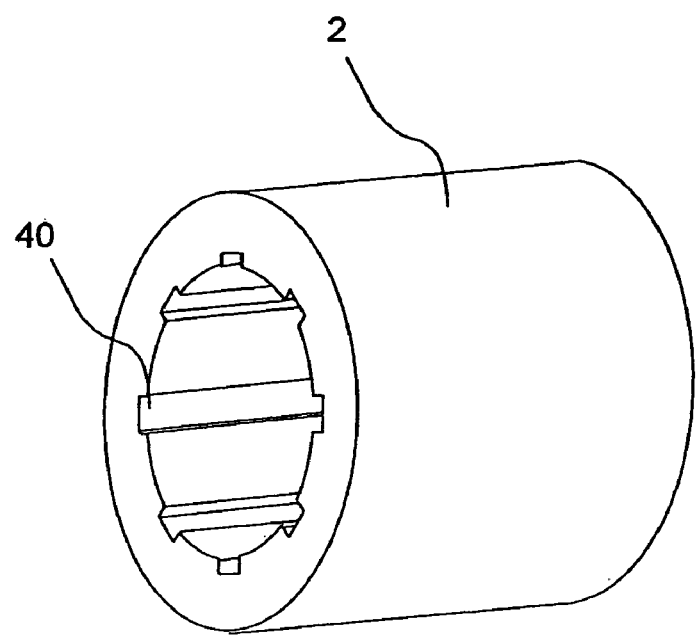
Figure 16:
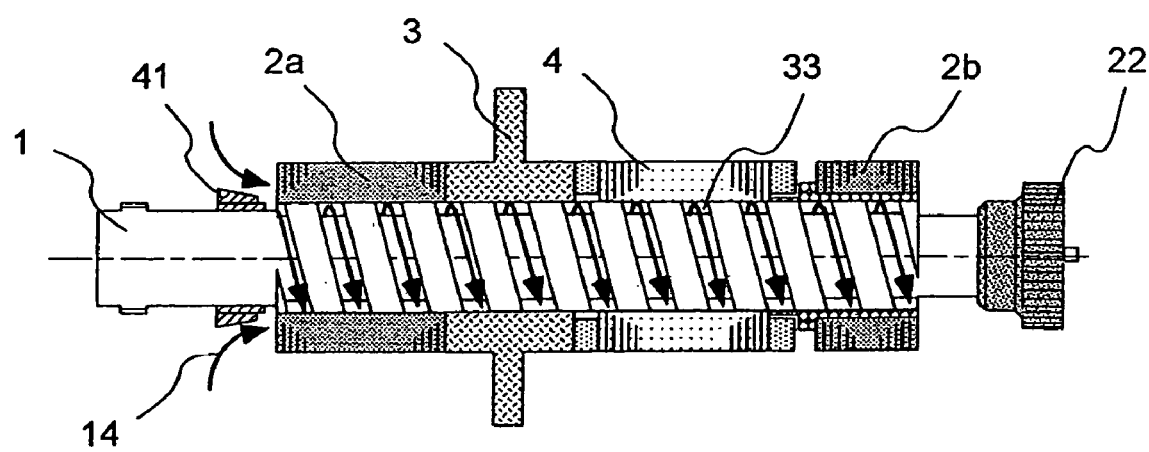
Figure 17:
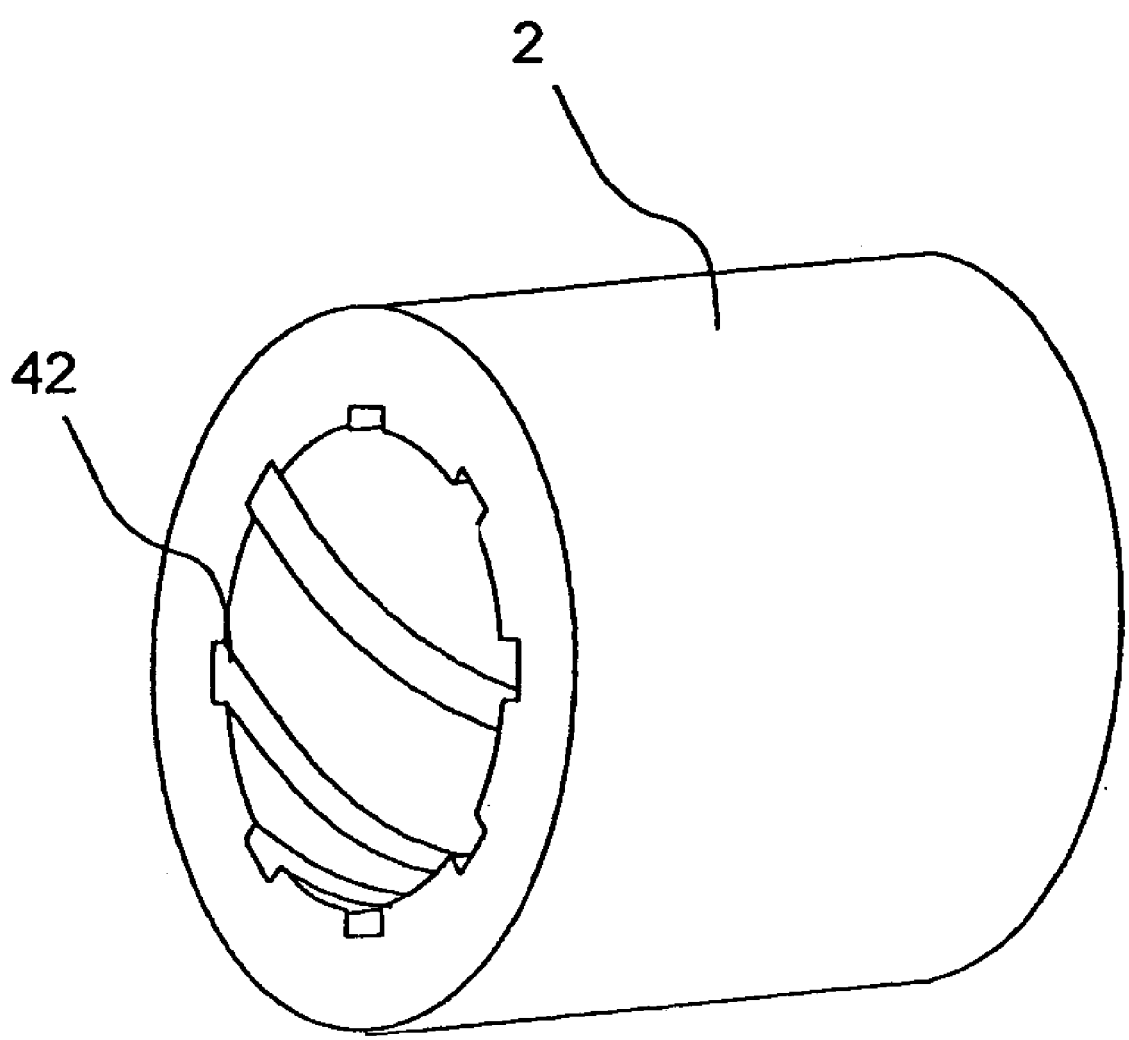

Part (a) in FIG. 2 is a front view of an axial positioning collar of an axial magnetic bearing stator, and part (b) in FIG. 2 is a sectional view taken along a line A—A in part (a) in FIG. 2;

FIG. 3 is a sectional view of a magnetic bearing spindle unit according to a second embodiment of the present invention;

Part (a) in FIG. 4 is a front view of an axial magnetic bearing stator, and part (b) in FIG. 4 is a sectional view taken along a line B—B in part (a) in FIG. 4;

FIG. 5 is a sectional view of a magnetic bearing spindle unit according to a third embodiment of the present invention;

FIG. 6 is a sectional view of a magnetic bearing spindle unit of a fourth embodiment of the present invention;

FIG. 7 is a sectional view of a magnetic bearing spindle unit according to a fifth embodiment of the present invention;

FIG. 8 is a perspective view of a rotation shaft shown in FIG. 7 as viewed from a front side of a front radial magnetic bearing rotor;

FIG. 9 is a perspective view of the rotation shaft before a radial magnetic bearing rotor, an axial magnetic bearing rotor and a main shaft motor rotor are fitted;

FIG. 10 is a sectional view of the rotation shaft which is cut at which each rotor is fitted;

FIG. 11 the outer diameter portion of the axial magnetic bearing rotor is formed into a triangular shape or a shape corresponding thereto is a sectional view of a magnetic bearing spindle unit according to a sixth embodiment of the present invention;

FIG. 12 is a perspective view of the rotation shaft before the radial magnetic bearing rotor, the axial magnetic bearing rotor and the main shaft motor rotor are fitted;

FIG. 13 is a sectional view of a configuration of an essential portion of a magnetic bearing spindle unit according to a seventh embodiment of the present invention;

FIG. 14 is a front view of a ring-like plate provided at its inner diameter portion with notches;

FIG. 15 is a perspective view of a radial magnetic bearing rotor formed at its inner diameter portion with notched groove extending in the axial direction of the rotor;

FIG. 16 is a sectional view of a configuration of an essential portion of a magnetic bearing spindle unit according to an eighth embodiment of the present invention; and FIG. 17 is a perspective view of a radial magnetic bearing rotor formed at its inner diameter portion with helical grooves.

BEST MODE FOR CARRYING OUT THE INVENTION

Exemplary embodiments of a magnetic bearing spindle unit according to the present invention will be explained in detail below with reference to the accompanying drawings.

Figure 1:
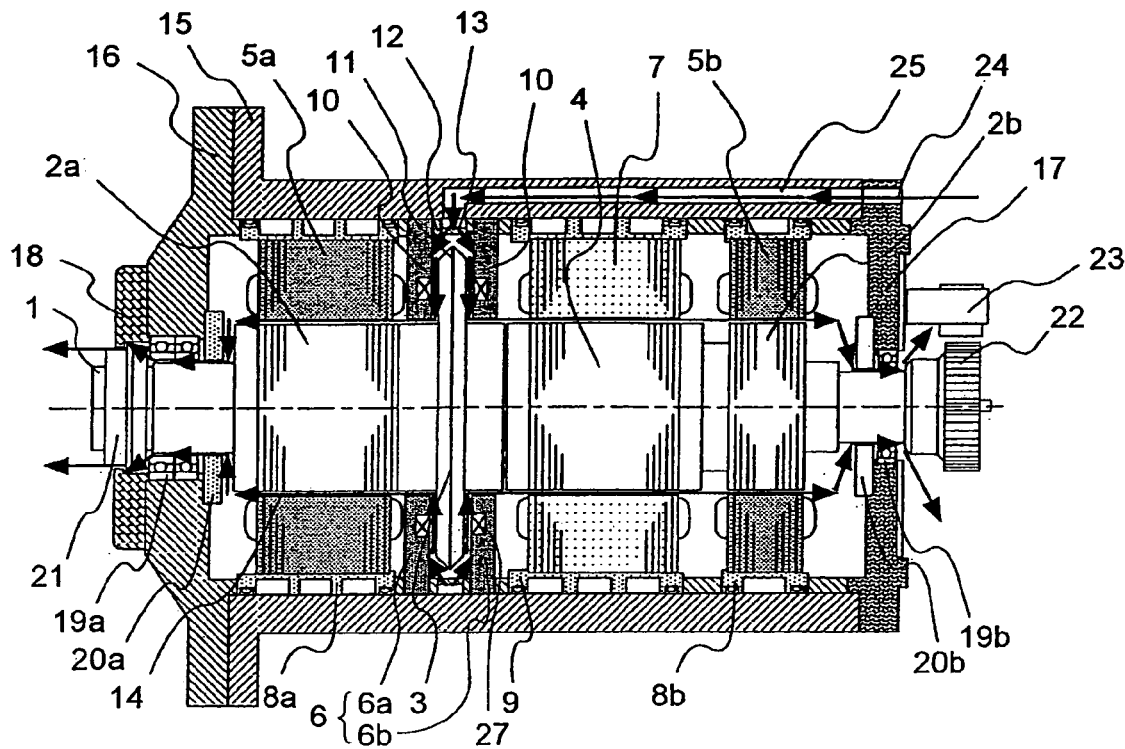
FIG. 1 is a sectional view of a magnetic bearing spindle unit according to a first embodiment of the present invention.

FIG. 1 is a sectional view of a magnetic bearing spindle unit according to a first embodiment of the present invention. A magnetic bearing spindle includes a rotation shaft 1, a radial magnetic bearing rotor 2 on which a ring-like electromagnetic steel sheet is laminated, an axial magnetic bearing rotor 3 made of magnetic material and a main shaft motor rotor 4. The rotation shaft 1 is fitted into the radial magnetic bearing rotor 2, the axial magnetic bearing rotor 3 and the main shaft motor rotor 4. The radial magnetic bearing rotor 2 includes a front radial magnetic bearing rotor 2a and a rear radial magnetic bearing rotor 2b. Only symbols 2a and 2b are shown in the drawings as these rotors.

Outer periphery (hereinafter, "outer diameter portion") of the axial magnetic bearing rotor 3 is formed as a triangular portion 11. When cooling air flowing from outside passes through a gap between the axial magnetic bearing rotor 3 and a later-described axial magnetic bearing stator 6, the triangular portion 11 reduces a variation rate of a tube resistance and restrains a swirl from being generated so that the cooling air can smoothly pass through the gap such that the cooling air can equally separate and flow into a load direction and a counter-load direction. If such an effect can be exhibited, a shape of the outer diameter portion of the axial magnetic bearing rotor 3 is not limited to the triangle shape, and may be a shape corresponding to the triangle shape (e.g., an apex of the triangular portion 11 is not sharp and is rather flat or round).

Four radial magnetic bearing stators 5 made of electromagnets are disposed in a radial direction of the outer diameter portion of the radial magnetic bearing rotor 2 at appropriate fine distances (normally about 0.5 to 1.0 millimeter) from one another. Each of the radial magnetic bearing stators 5 includes a front radial magnetic bearing stator 5a and a rear radial magnetic bearing stator 5b which are disposed such as to correspond to the front radial magnetic bearing rotor 2a and the rear radial magnetic bearing rotor 2b, respectively.

Axial magnetic bearing stators 6 (load-side axial magnetic bearing stator 6a and counter-load-side axial magnetic bearing stator 6b) including a pair of ring-like electromagnets and having an outer magnetic pole tooth 10 and a coil 27 are disposed in the vicinity of the axial magnetic bearing rotor 3 such as to sandwich the axial magnetic bearing rotor 3. The axial magnetic bearing stators 6 are disposed at an appropriate fine distance (normally about 0.5 to 1.0 millimeter) from each other. The axial magnetic bearing stators 6a and 6b are positioned in the axial direction by a ring-like collar 12.

A main shaft motor stator 7 for rotating the rotation shaft 1 is disposed in the vicinity of the main shaft motor rotor 4 at an appropriate fine distance from the outer diameter portion of the main shaft motor rotor 4 in the radial direction. Oil jackets 8 and 9 for cooling the stators are mounted on the radial magnetic bearing stator 5 and the outer diameter portion of the main shaft motor stator 7. The oil jacket 8 includes an oil jacket 8a for cooling the front radial magnetic bearing stator 5a and an oil jacket 8b for cooling the rear radial magnetic bearing stator 5b.

The rotation shaft 1, the radial magnetic bearing stator 5, the axial magnetic bearing stator 6 and the main shaft motor stator 7 are accommodated in a frame 15. A load-side bracket 16 and a counter-load-side bracket 17 are mounted on the frame 15. A non-contact displacement sensor 20 for controlling the magnetic bearing is mounted on the load-side bracket 16 and the counter-load-side bracket 17 at an appropriate fine distance (normally about 0.5 millimeter) from the rotation shaft 1. A protect bearing (also called touchdown bearing) 19 for preventing the unit from being damaged at the time of emergency is mounted at an appropriate fine distance (normally about 0.2 millimeters) from the rotation shaft 1. The protect bearing 19 includes a load-side protect bearing 19a and a counter-load-side protect bearing 19b. The load-side protect bearing 19a is fixed to the load-side bracket 16 by means of a mounting lid 18 and a special nut 21.

A radial position and an axial position of the rotation shaft 1 is measured by the non-contact displacement sensor 20. The rotation shaft 1 is provided at its front and rear portions with a front displacement sensor 20a and a rear displacement sensor 20b, respectively. Based on a signal output from the non-contact displacement sensor 20, appropriate magnetic attraction is generated in a gap between the radial magnetic bearing stator 5 and the radial magnetic bearing rotor 2, and a gap between the axial magnetic bearing stator 6 and the axial magnetic bearing rotor 3, and the rotation shaft 1 is supported in a non-contact manner at a target position separated away from the stators 5, 6 and 7. In this non-contact state, appropriate voltage is applied to the main shaft motor stator 7, thereby realizing super high speed rotation (about 70000 r/min or higher) of the rotation shaft 1. The number of revolution of the rotation shaft 1 is detected by an encoder gear 22 and an encoder head 23.

Part (a) in FIG. 2 is a front view of the collar 12, and part (b) is a sectional view of the collar 12 taken along a line A—A in part (a) of FIG. 2. The collar 12 is provided at its outer diameter portion with a plurality of through holes 13 equally formed in the radial direction. As illustrated in FIG. 1, the frame 15 is provided with an air passage 25 for flowing cooling air from the through holes 13, and the counter-load-side bracket 17 is provided with a cooling air supply port 24. Arrows 14 in FIG. 1 indicate the direction in which cooling air flows.

Cooling air supplied from the cooling air supply port 24 of the counter-load-side bracket 17 passes through the air passage 25 in the frame 15 and flows into the spindle unit from the collar 12. Since the collar 12 is provided with the through holes 13 formed equally in the radial direction, the cooling air equally flows from the plurality of portions of the outer diameter portion of the axial magnetic bearing rotor 3.

Since the outer diameter portion of the axial magnetic bearing rotor 3 is formed as the triangular portion 11, when the cooling air passes through the gap between the axial magnetic bearing rotor 3 and the axial magnetic bearing stator 6, the variation rate of the tube resistance can be reduced and the swirl can be restrained from being generated, the cooling air can smoothly pass through the gap and the cooling air can equally be separated into the load direction and the counter-load direction.

Axial thickness of the axial magnetic bearing stator 6 is relatively small (normally about 10 to 20 millimeters), it is difficult to provide the outer diameter portion of the axial magnetic bearing stator 6 with a conventional cooling jacket to cool the axial magnetic bearing stator 6, but according to the present invention, since the cooling air passes through the gap, the axial magnetic bearing stator 6 can easily be cooled.

The cooling air flowing into the load direction passes through the gap between the front radial magnetic bearing rotor 2a and the front radial magnetic bearing stator 5a, and directly cools the front radial magnetic bearing rotor 2a and the front radial magnetic bearing stator 5a and then, passes through the gap between the rotation shaft 1 and the load-side protect bearing 19a and flows out into outside atmosphere.

The cooling air flowing in the counter-load direction passes through the gap between the main shaft motor rotor 4 and the main shaft motor stator 7 and the gap between the rear radial magnetic bearing rotor 2b and the rear radial magnetic bearing stator 5b and directly cools the rotors 4, 2b and the stators 7, 5b and then, passes through the gap between the rotation shaft 1 and the counter-load-side protect bearing 19b and flows out into outside atmosphere.

In the magnetic bearing spindle of the first embodiment, as the rotation shaft 1 and the stators 5, 6 and 7 can be cooled by air, a mechanical arrangement to pass the cooling medium becomes unnecessary. Since the stators 5 and 7 can be liquid cooled as well by means of the oil jackets 8 and 9, the stators can be applied to the magnetic bearing spindle which rotates at extremely high speed. Moreover, this magnetic bearing spindle has a simple configuration.

Part (a) in FIG. 4 is a front view of an axial magnetic bearing stator, and part (b) is a sectional view of the an axial magnetic bearing stator taken along a line B—B in part (a) of FIG. 4. In the following explanations, same or corresponding members which have already been explained above are designated with like symbols, and redundant explanation is omitted or simplified.

In FIG. 3, the axial magnetic bearing stator 6 has the collar 12 which is provided at its outer diameter portion with a plurality of through holes 13 formed equally in the radial direction. The frame 15 is provided with an air passage 25 so that cooling air can flow in from the through holes 13. The counter-load-side bracket 17 is provided with the cooling air supply port 24. A plurality of through holes 26 are provided (see parts (a) and (b) of FIG. 4) in portions of the outer magnetic pole tooth 10 of the axial magnetic bearing stator 6 where the axial magnetic bearing rotor 3 is not opposed and where it is unnecessary to provide a magnetic circuit. The through holes 26 are provided at equal distances from one another.

Cooling air supplied from the cooling air supply port 24 of the counter-load-side bracket 17 passes through the air passage 25 in the frame 15, and flows into the spindle unit from the collar 12 of the axial magnetic bearing stator 6. Since the collar 12 is provided at its outer diameter portion with the through holes 13 formed in the radial direction, cooling air flows in from the plurality of portions of the outer diameter portion of the axial magnetic bearing rotor 3.

Since the outer magnetic pole tooth 10 of the axial magnetic bearing stator 6 is provided with the through holes 26, the tube resistance is reduced, the cooling air is separated substantially equally into the load direction and the counter-load direction and passes through the through holes 26, and a portion of the cooling air passes through the gap between the axial magnetic bearing rotor 3 and the axial magnetic bearing stator 6. With this configuration, the axial magnetic bearing stator 6 is efficiently cooled from axially opposite surfaces by the cooling air.

Cooling air flowing into the load direction passes through the gap between the front radial magnetic bearing rotor 2a and the front radial magnetic bearing stator 5a and directly cools the rotor 2a and the stator 5a and then, passes through the gap between the rotation shaft 1 and the load-side protect bearing 19a and flows out into the outside atmosphere. Cooling air flowing in the counter-load direction passes through the gap between the main shaft motor rotor 4 and the main shaft motor stator 7, and the gap between the rear radial magnetic bearing rotor 2b and the rear radial magnetic bearing stator 5b, directly cools the rotors 4, 2b and the stators 7, 5b and then, passes through the gap between the rotation shaft 1 and the counter-load-side protect bearing 19b and flows out into the outside atmosphere.

In the magnetic bearing spindle of the second embodiment, as the rotation shaft 1 and the stators 5, 6 and 7 can be cooled by air, a mechanical arrangement to pass the cooling medium becomes unnecessary. Since the stators 5 and 7 can be liquid cooled as well by means of the oil jackets 8 and 9, the stators can be applied to the magnetic bearing spindle which rotates at extremely high speed. Moreover, this magnetic bearing spindle has a simple configuration.

FIG. 5 is a sectional view of a magnetic bearing spindle unit according to a third embodiment of the present invention. The axial magnetic bearing stator 6 has the collar 12 which is provided at its outer diameter portion with a plurality of through holes 13 formed equally in the radial direction. The frame 15 is provided with an air passage 25 so that cooling air can flow in from the through holes 13. The counter-load-side bracket 17 is provided with the cooling air supply port 24.

Through holes 30, 26 and 31 are provided at equal distances from one another in such a core back 28 of the radial magnetic bearing stator 5, the outer magnetic pole tooth 10 of the axial magnetic bearing stator 6 and a core back 29 of the main shaft motor stator 7 that are unnecessary for a magnetic circuit. In FIG. 5, the core back 28 is illustrated as a core back 28a of the front radial magnetic bearing stator 5a and a core back 28b of the rear radial magnetic bearing stator 5b. The through hole 30 is illustrated as a through hole 30a provided in the axial direction of the core back 28a and as a through hole 30b provided in the axial direction of the core back 28b.

Cooling air supplied from the cooling air supply port 24 of the counter-load-side bracket 17 passes through the air passage 25 in the frame 15, and flows into the spindle unit from the collar 12 of the axial magnetic bearing stator 6. Since the collar 12 is provided at the outer diameter portion with the through holes 13 in the radial direction, the cooling air equally flows in from the plurality of locations of the outer diameter portion of the axial magnetic bearing rotor 3.

Since the outer magnetic pole tooth 10 of the axial magnetic bearing stator 6 is provided with the through holes 26, the tube resistance is reduced, the cooling air passes through the through holes 26 in the load direction and the counter-load direction substantially equally, and a portion of the cooling air passes through the gap between the axial magnetic bearing rotor 3 and the axial magnetic bearing stator 6. With this configuration, the axial magnetic bearing stator 6 is efficiently cooled from the axially opposite surfaces by the cooling air.

Further, the cooling air flowing in the load direction passes through the through hole 30a provided in the core back 28a of the front radial magnetic bearing stator 5a and through the gap between the front radial magnetic bearing rotor 2a and the front radial magnetic bearing stator 5a, and directly cools the rotor 2a and the stator 5a and then, passes through the gap between the rotation shaft 1 and the load-side protect bearing 19a and flows out into the outside atmosphere.

On the other hand, the cooling air flowing in the counter-load direction passes through the through holes 31 and 30b provided in the core back 29 of the main shaft motor stator 7 and the core back 28b of the rear radial magnetic bearing stator 5b, and through the gap between the main shaft motor rotor 4 and the main shaft motor stator 7, and the gap between the rear radial magnetic bearing rotor 2b and the rear radial magnetic bearing stator 5b, directly cools the rotors 4, 2b and the stators 7, 5b and then, passes through the gap between the rotation shaft 1 and the counter-load-side protect bearing 19b, and flows out into the outside atmosphere.

In the magnetic bearing spindle of the third embodiment, as the rotation shaft 1 and the stators 5, 6 and 7 can be cooled by air, a mechanical arrangement to pass the cooling medium becomes unnecessary. Since the stators 5 and 7 can be liquid cooled by means of the oil jackets 8 and 9, the stators can be applied to the magnetic bearing spindle which rotates at extremely high speed. Moreover, this magnetic bearing spindle has a simple configuration.

The fourth embodiment of the present invention will be explained next. FIG. 6 is a sectional view of a magnetic bearing spindle unit according to a fourth embodiment of the present invention. In FIG. 6, the axial magnetic bearing stator 6 has the collar 12 which is provided at its outer diameter portion with a plurality of through holes 13 formed equally in the radial direction. The frame 15 is provided with an air passage 25 so that cooling air can flow in from the through holes 13. The counter-load-side bracket 17 is provided with the cooling air supply port 24.

The outer diameter portion of the axial magnetic bearing rotor 3 is formed as the triangular portion 11. Through holes 30, 26 and 31 are provided in the core back 28 of the radial magnetic bearing stator 5, the outer magnetic pole tooth 10 of the axial magnetic bearing stator 6 and the core back 29 of the main shaft motor stator 7 at equal distances from one another. The through holes are provided in the portions which do not require the magnetic circuit.

According to the configuration, cooling air supplied from the cooling air supply port 24 of the counter-load-side bracket 17 passes through the air passage 25 in the frame 15, and flows into the spindle unit from the collar 12 of the axial magnetic bearing stator 6. Since the through holes 13 are provided in the outer diameter portion of the collar 12 in the radial direction, the cooling air flows in from the plurality of locations of the outer diameter portion of the axial magnetic bearing rotor 3.

Further, since the outer diameter portion of the axial magnetic bearing rotor 3 is formed as the triangular portion 11, air can smoothly separately flow in the load direction and the counter-load direction, a swirl can be restrained from being generated, and the variation rate of the tube resistance of a portion of cooling air passing through the gap between the axial magnetic bearing rotor 3 and the axial magnetic bearing stator 6 can be reduced.

A portion of the cooling air separated in the load direction and the counter-load direction flows toward the core back of the axial magnetic bearing stator 6. Thus, the axial magnetic bearing stator 6 is efficiently cooled from axially opposite surfaces by the cooling air.

The cooling air flowing in the load direction passes through the through hole 30a provided in the core back 28a of the front radial magnetic bearing stator 5a and through the gap between the front radial magnetic bearing rotor 2a and the front radial magnetic bearing stator 5a, directly cools the front radial magnetic bearing rotor 2a and the front radial magnetic bearing stator 5a and then, passes through the gap between the rotation shaft 1 and the load-side protect bearing 19a and flows out into the outside atmosphere.

On the other hand, cooling air flowing in the counter-load direction passes through the through holes 31 and 30b provided in the core back 29 of the main shaft motor stator 7 and the core back 28b of the rear radial magnetic bearing stator 5b, and through the gap between the main shaft motor rotor 4 and the main shaft motor stator 7 and the gap between the rear radial magnetic bearing rotor 2b and the rear radial magnetic bearing stator 5b, directly cools the rotors 4, 2b and the stators 7, 5b and then, passes through the gap between the rotation shaft 1 and the counter-load-side protect bearing 19b and flows out into the outside atmosphere.

In the magnetic bearing spindle of the fourth embodiment, as the rotation shaft 1 and the stators 5, 6 and 7 can be cooled by air, a mechanical arrangement to pass the cooling medium becomes unnecessary. Since the stators 5 and 7 can be liquid cooled by means of the oil jackets 8 and 9, the stators can be applied to the magnetic bearing spindle which rotates at extremely high speed. Moreover, this magnetic bearing spindle has a simple configuration.

FIG. 7 is a sectional view of a magnetic bearing spindle unit according to a fourth embodiment of the present invention. The shape of a rotation shaft 1A illustrated in FIG. 7 is different from that of the rotation shaft 1 in FIG. 1. FIG. 8 is a perspective view of the rotation shaft 1A, as viewed from a front side of the front radial magnetic bearing rotor 2a. FIG. 9 is a perspective view of the rotation shaft 1A before the rotation shaft 1A is fitted into the radial magnetic bearing rotor 2, the axial magnetic bearing rotor 3 and the main shaft motor rotor 4. FIG. 10 is a sectional view of the rotation shaft 1A taken along a line at which the rotation shaft 1A is fitted into the rotors 2, 3 and 4.

As illustrated in FIG. 8, in the outer diameter portion of the rotation shaft 1A, a fitting section 36 to which the radial magnetic bearing rotor 2, the axial magnetic bearing rotor 3 and the main shaft motor rotor 4 are fitted is formed with several grooves 32 extending in the axial direction. By fitting the rotation shaft 1A into the radial magnetic bearing rotor 2, the axial magnetic bearing rotor 3 and the main shaft motor rotor 4 such that the adjacent rotors are in intimate contact with each other in the axial direction, an air passage 33 is formed in the rotation shaft 1A (see FIG. 7).

Spindle forward sides of the air passages 33 are formed with helical fins 34 which are integral with the rotation shaft 1A. The number of helical fins 34 is the same as that of the air passages 33. When the main shaft motor rotor 4 is rotated in the normal direction 35, the helical direction of the helical fin 34 is set to a direction in which air is taken into an inlet of the air passage 33, and a terminal end of the helical fin 34 closer to the rotation shaft 1A is aligned with a projection of the groove 32.

Cooling air supplied from the cooling air supply port 24 of the counter-load-side bracket 17 passes through the air passage 25 in the frame 15, and flows into the spindle unit from the collar 12 of the axial magnetic bearing stator 6. The cooling air is substantially equally separated into the load direction and the counter-load direction.

When the rotation shaft 1A is not rotating, cooling air flowing in the load direction passes through the gap of the front displacement sensor 20*a* and the gap of the load-side protect bearing 19*a* and flows out into the outside atmosphere. Cooling air flowing in the counter-load direction passes through the gap of the rear displacement sensor 20*b* and the gap of the counter-load-side protect bearing 19*b* and flows out into the outside atmosphere.

When the rotation shaft 1A is rotated in the normal direction 35 by the main shaft motor rotor 4, cooling air flowing in the load direction is taken into the air passage 33 in the rotation shaft 1A by the helical fins 34, and air flowing into the passage 33 cools an interior of the rotation shaft 1A and then the air is discharged rearward of the spindle unit and flows out into the outside atmosphere.

In the magnetic bearing spindle of the fifth embodiment, as the rotation shaft 1A can be cooled from inside by air, a mechanical arrangement to pass the cooling medium becomes unnecessary. Therefore, this magnetic bearing spindle can be used at circumstances where extremely high speed rotation is required. Moreover, this magnetic bearing spindle has simple configuration.

Sixth embodiment.

FIG. 11 is a sectional view of a magnetic bearing spindle unit according to a sixth embodiment of the present invention. The shape of a rotation shaft 1B illustrated in FIG. 11 is different from that of the rotation shaft 1 in FIG. 7. FIG. 12 is a perspective view of the rotation shaft 1B before it is fitted into the radial magnetic bearing rotor 2, through hole axial magnetic bearing rotor 3 and the main shaft motor rotor 4, in FIG. 11.

The air passage illustrated in FIG. 9 includes a long groove 32 that extends in the axial direction, but the air passage illustrated in FIG. 12 includes a plurality of helical grooves 37.

Cooling air supplied from the cooling air supply port 24 of the counter-load-side bracket 17 passes through the air passage 25 in the frame 15, and flows into the spindle unit from the collar 12 of the axial magnetic bearing stator 6. The cooling air is substantially equally separated into the load direction and the counter-load direction.

When the rotation shaft 1B is not rotating, cooling air flowing in the load direction passes through the gap of the front displacement sensor 20*a* and the gap of the load-side protect bearing 19*a* and flows out into the outside atmosphere. Cooling air flowing in the counter-load direction passes through the gap of the rear displacement sensor 20*b* and the gap of the counter-load-side protect bearing 19*b* and flows out into the outside atmosphere.

When the rotation shaft 1B is rotated in the normal direction 35 by the main shaft motor rotor 4, cooling air flowing in the load direction is taken into the air passage 33 in the rotation shaft 1B by the helical fins 34. The cooling air taken into the rotation shaft 1B moves therein in the axial direction and circulates in the circumferential direction also and cools the interior of the rotation shaft 1B and then the air is discharged rearward of the spindle unit and flows out into the outside atmosphere.

In the magnetic bearing spindle of the sixth embodiment, as the rotation shaft 1B can be cooled from inside by air, a mechanical arrangement to pass the cooling medium becomes unnecessary. Therefore, this magnetic bearing spindle can be used at circumstances where extremely high speed rotation is required. Moreover, this magnetic bearing spindle has simple configuration.

FIG. 13 is a sectional view of a configuration of an essential portion of a magnetic bearing spindle unit according to a seventh embodiment of the present invention. FIG. 14 is a front view of a ring-like plate whose inner periphery (hereinafter, "inner diameter portion") is formed with notches, and FIG. 15 is a perspective view of a radial magnetic bearing rotor whose inner diameter portion is formed with notched grooves in the axial direction.

Only a rotation body, the configuration of which is different from that shown in FIGS. 7 and 8, is illustrated in FIG. 13. The configuration other than the rotation body is the same as that illustrated in FIGS. 7 and 8.

That is in FIGS. 7 and 8, the air passage 33 is formed by the groves 32 that are formed on the rotation shaft 1 itself.

Whereas, as illustrated in FIGS. 13 and 14, a ring-like plate 39 with a plurality of notches 38 at its inner diameter portion is prepared, a plurality of such ring-like plates 39 are laminated in such a manner that the notches 38 are aligned parallel to a rotation shaft 1C. This results in the formation of a radial magnetic bearing rotor 222 as illustrated in FIG. 15. Inner diameter portions of an axial magnetic bearing rotor 333 and a main shaft motor rotor 444 are also formed with notched grooves 40 using the same technique, the notched grooves 40 in the inner diameter portion of the rotors 333 and 444 are fitted to the rotation shaft 1C such that the notched grooves 40 are aligned with each other in the axial direction, thereby forming the air passage 33. The helical fin ring 41 having the helical fin 34 is fitted to an inlet of the air passage 33. As a result, an air passage having same or similar shape as that of the air passage 33 illustrated in FIG. 7 is obtained.

According to this configuration, the same effect as that of the fifth embodiment (see FIG. 7) can be obtained. Moreover, as the complicated groove machining operation of the rotation shaft 1C can be omitted, the process of manufacturing the magnetic bearing spindle unit becomes simple.

FIG. 16 is a sectional view of a configuration of an essential portion of a magnetic bearing spindle unit according to an eighth embodiment of the present invention. FIG. 17 is a perspective view of a radial magnetic bearing rotor whose inner diameter portion is formed with a helical groove. Only a rotation body, the configuration of which is different from that shown in FIGS. 11 and 12, is illustrated in FIG. 16. The configuration other than the rotation body is the same as that illustrated in FIGS. 11 and 12.

As illustrated in FIG. 11, in the sixth embodiment, the outer diameter portion of the rotation shaft 1B is previously formed with grooves 32 extending in the axial direction, and the fitting section 36 is fitted to the radial magnetic bearing rotor 2, the axial magnetic bearing rotor 3 and the main shaft motor rotor 4 such that the adjacent rotors come into intimate contact with each other, thereby forming the air passage 33.

Whereas, as illustrated in FIGS. 16 and 17, in the eighth embodiment, a ring-like plate 39 with a plurality of notches 38 at its inner diameter portion is prepared, a plurality of such ring-like plates 39 are laminated such that the notches 38 form the helical grooves 42 in the axial direction, thereby forming a radial magnetic bearing rotor 223. Inner diameter portion of an axial magnetic bearing rotor 334 and a main shaft motor rotor 445 are also formed with the helical grooves 42 using the same technique, the rotation shaft 1C is fitted to a radial magnetic bearing rotor 223, the axial magnetic bearing rotor 334 and the main shaft motor rotor 445 such that the helical grooves 42 of the inner diameter portions of these rotors are continuous in the axial direction, thereby forming the air passage 33. The helical fin ring 41 having the helical fin 34 is fitted to the inlet of the air passage 33. As a result, an air passage having same or similar shape as that of the air passage 33 illustrated in FIG. 11 is obtained.

According to this configuration, the same effect as that of the sixth embodiment (see FIG. 11) can be obtained. Moreover, as the complicated groove machining operation of the rotation shaft 4 can be omitted, the process of manufacturing the magnetic bearing spindle unit becomes simple.

Although the first to the eighth embodiments have been explained above, the present invention is not limited to those, and the embodiments can be combined arbitrary and carried out.

Although the present invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

INDUSTRIAL APPLICABILITY

As described above, the magnetic bearing spindle of this invention can efficiently cool the heat source with a simple configuration and thus, the magnetic bearing spindle is suitable for a spindle unit for a machine tool used in a super high rotation region.

The invention claimed is:

1. A magnetic bearing spindle comprising:
a rotation shaft that is (1) fixed with a radial magnetic bearing rotor, an axial magnetic bearing rotor, and a main shaft motor rotor, and (2) held rotatably, wherein an outer peripheral portion of the axial magnetic bearing rotor is formed into a triangular shape or a shape corresponding to a triangular shape;
a radial magnetic bearing stator that is disposed around the radial magnetic bearing rotor;
an axial magnetic bearing stator that is disposed in an operational vicinity of the axial magnetic bearing rotor and has an axial direction positioning member, wherein an outer peripheral portion of the axial direction positioning member has a plurality of through holes; and
a casing that accommodates the rotation shaft, the radial magnetic bearing stator, the axial magnetic bearing stator, and the main shaft stator and includes an air passage to pass cooling air from outside to the through holes.

2. The magnetic bearing spindle according to claim 1, wherein an outer peripheral port ion of the rotation shaft is provided with a plurality of grooves extending in an axial direction of the rotation shaft , the radial magnetic bearing rotor, the axial magnetic bearing rotor, and the main shaft motor rotor are fitted to a fitting section of the grooves such that said rotors are adjacent as well as in contact with each other in the axial direction, thereby forming an air passage, at least one of an outlet and an inlet of the air passage is provided with a helical fin which enhances cooling air intake efficiency to the air passage.

3. The magnetic bearing spindle according to claim 1, wherein an outer peripheral port ion of the rotation shaft is provided with a plurality of helical grooves extending in an axial direction of the rotation shaft, the radial magnetic bearing rotor, the axial magnetic bearing rotor, and the main shaft motor rotor are fitted to a fitting section of the helical grooves such that said rotors are adjacent as well as in contact with each other in the axial direction, thereby forming an air passage, at least one of an outlet and an inlet of the air passage is provided with a helical fin which enhances cooling air intake efficiency to the air passage.

4. The magnetic bearing spindle according to claim 1, wherein each of the radial magnetic bearing rotor, the axial magnetic bearing rotor, and the main shaft motor rotor is fabricated with a plurality of ring-like plates, each plate having a plurality of notches on an inner periphery by laminating the plates such that the notches form a plurality of grooves that are substantially parallel to the rotation shaft thereby forming an air passage, at least one of an outlet and an inlet of the air passage is provided with a helical fin which enhances cooling air intake efficiency to the air passage.

5. The magnetic bearing spindle according to claim 1, wherein each of the radial magnetic bearing rotor, the axial magnetic bearing rotor, and the main shaft motor rotor is fabricated with a plurality of ring-like plates, each plate having a plurality of notches on an inner periphery by laminating the plates such that the notches form a plurality of grooves that make an angle to the rotation shaft thereby forming an air passage, at least one of an outlet and an inlet of the air passage is provided with a helical fin which enhances cooling air intake efficiency to the air passage.

6. A magnetic bearing spindle comprising:
a rotation shaft that is (1) fixed with a radial magnetic bearing rotor, an axial magnetic bearing rotor and a main shaft motor rotor, and (2) held rotatably;
a radial magnetic bearing stator that is disposed around the radial magnetic bearing rotor;
an axial magnetic bearing stator that is disposed in an operational vicinity of the axial magnetic bearing rotor and has a plurality of first through holes and portions of an outer magnetic pole tooth of the axial magnetic bearing stator, to which the axial magnetic bearing rotor is not opposed and which are not necessary for a magnetic circuit, are provided with a plurality of second through holes that are parallel to an axial direction of the rotation shaft and that communicate with the first through holes; and
a casing that accommodates the rotation shaft, the radial magnetic bearing stator, the axial magnetic bearing stator, and the main shaft motor stator, and includes an air passage to pass cooling air from outside to the first through holes.

7. The magnetic bearing spindle according to claim 6, wherein an outer peripheral portion of the rotation shaft is provided with a plurality of grooves extending in an axial direction of the rotation shaft, the radial magnetic bearing rotor, the axial magnetic bearing rotor, and the main shaft motor rotor are fitted to a fitting section of the grooves such that said rotors are adjacent as well as in contact with each other in the axial direction, thereby forming an air passage, at least one of an outlet and an inlet of the air passage is provided with a helical fin which enhances cooling air intake efficiency to the air passage.

8. The magnetic bearing spindle according to claim 6, wherein an outer peripheral portion of the rotation shaft is provided with a plurality of helical grooves extending in an axial direction of the rotation shaft, the radial magnetic bearing rotor, the axial magnetic bearing rotor, and the main shaft motor rotor are fitted to a fitting section of the helical grooves such that said rotors are adjacent as well as in contact with each other in the axial direction, thereby forming an air passage, at least one of an outlet and an inlet of the air passage is provided with a helical fin which enhances cooling air intake efficiency to the air passage.

9. The magnetic bearing spindle according to claim 6, wherein each of the radial magnetic bearing rotor, the axial magnetic bearing rotor, and the main shaft motor rotor is fabricated with a plurality of ring-like plates, each plate having a plurality of notches on an inner periphery by laminating the plates such that the notches form a plurality of grooves that are substantially parallel to the rotation shaft thereby forming an air passage, at least one of an outlet and an inlet of the air passage is provided with a helical fin which enhances cooling air intake efficiency to the air passage.

10. The magnetic bearing spindle according to claim 6, wherein each of the radial magnetic bearing rotor, the axial magnetic bearing rotor, and the main shaft motor rotor is fabricated with a plurality of ring-like plates, each plate having a plurality of notches on an inner periphery by laminating the plates such that the notches form a plurality of grooves that make an angle to the rotation shaft thereby forming an air passage, at least one of an outlet and an inlet of the air passage is provided with a helical fin which enhances cooling air intake efficiency to the air passage.

11. The magnetic bearing spindle according to claim 6, wherein the outer peripheral portion of the axial magnetic bearing rotor is formed into a triangular shape or a shape corresponding to a triangular shape.

12. A magnetic bearing spindle comprising:
- a rotation shaft that is (1) fixed with a radial magnetic bearing rotor, an axial magnetic bearing rotor, a main shaft motor rotor, and (2) held rotatably;
- a radial magnetic bearing stator that is disposed around the radial magnetic bearing rotor, wherein a portion of a core back of the radial magnetic bearing stator has plurality of through holes;
- an axial magnetic bearing stator that is disposed in an operational vicinity of the axial magnetic bearing rotor and has an axial direction positioning member, wherein an outer peripheral portion of the axial direction positioning member has a plurality of through holes and a first portion of the outer magnetic pole tooth of the axial magnetic bearing stator has a plurality of through holes, the first portion not being necessary for a magnetic circuit;
- a casing that accommodates the rotation shaft, the radial magnetic bearing stator, the axial magnetic bearing stator, and the main shaft motor stator and includes an air passage to pass cooling air from outside to the through holes.

13. The magnetic bearing spindle according to claim 12, wherein an outer peripheral portion of the rotation shaft is provided with a plurality of grooves extending in an axial direction of the rotation shaft, the radial magnetic bearing rotor, the axial magnetic bearing rotor, and the main shaft motor rotor are fitted to a fitting section of the grooves such that said rotors are adjacent as well as in contact with each other in the axial direction, thereby forming an air passage, at least one of an outlet and an inlet of the air passage is provided with a helical fin which enhances cooling air intake efficiency to the air passage.

14. The magnetic bearing spindle according to claim 12, wherein an outer peripheral portion of the rotation shaft is provided with a plurality of helical grooves extending in an axial direction of the rotation shaft, the radial magnetic bearing rotor, the axial magnetic bearing rotor, and the main shaft motor rotor are fitted to a fitting section of the helical grooves such that said rotors are adjacent as well as in contact with each other in the axial direction, thereby forming an air passage, at least one of an outlet and an inlet of the air passage is provided with a helical fin which enhances cooling air intake efficiency to the air passage.

15. The magnetic bearing spindle according to claim 12, wherein each of the radial magnetic bearing rotor, the axial magnetic bearing rotor, and the main shaft motor rotor are fabricated with a plurality of ring-like plates, each plate having a plurality of notches on an inner periphery by laminating the plates such that the notches form a plurality of grooves that are substantially parallel to the rotation shaft thereby forming an air passage, at least one of an outlet and an inlet of the air passage is provided with a helical fin which enhances cooling air intake efficiency to the air passage.

16. The magnetic bearing spindle according to claim 12, wherein each of the radial magnetic bearing rotor, the axial magnetic bearing rotor, and the main shaft motor rotor are fabricated with a plurality of ring-like plates, each plate having a plurality of notches on an inner periphery by laminating the plates such that the notches form a plurality of grooves that make an angle to the rotation shaft thereby forming an air passage, at least one of outlet and inlet of the air passage is provided with a helical fin which enhances cooling air intake efficiency to the air passage.

17. The magnetic bearing spindle according to claim 12, wherein the outer peripheral portion of the axial magnetic bearing rotor is formed into a triangular shape or a shape corresponding to a triangular shape.

* * * * *